(12) United States Patent
Ocher

(10) Patent No.: US 9,436,746 B2
(45) Date of Patent: Sep. 6, 2016

(54) NEXT GENERATION ARCHITECTURE FOR DATABASE CONNECTIVITY

(71) Applicant: Alexander Ocher, San Jose, CA (US)

(72) Inventor: Alexander Ocher, San Jose, CA (US)

(73) Assignee: SAP SE, Walldorf (DE)

( * ) Notice: Subject to any disclaimer, the term of this patent is extended or adjusted under 35 U.S.C. 154(b) by 306 days.

(21) Appl. No.: 14/158,921

(22) Filed: Jan. 20, 2014

(65) Prior Publication Data

US 2015/0205845 A1  Jul. 23, 2015

(51) Int. Cl.
*G06F 17/00* (2006.01)
*G06F 7/00* (2006.01)
*G06F 17/30* (2006.01)

(52) U.S. Cl.
CPC ... *G06F 17/30563* (2013.01); *G06F 17/30545* (2013.01); *G06F 17/30592* (2013.01); *G06F 17/30864* (2013.01)

(58) Field of Classification Search
CPC .......... G06F 17/30563; G06F 17/30864; G06F 17/30545; G06F 17/30592; G06F 17/30424; G06F 17/30516; G06F 17/30091
See application file for complete search history.

(56) References Cited

U.S. PATENT DOCUMENTS

| | | | |
|---|---|---|---|
| 7,761,406 B2 | 7/2010 | Harken | |
| 7,770,186 B2 | 8/2010 | Acheson et al. | |
| 7,974,896 B2 | 7/2011 | Busse et al. | |
| 8,271,430 B2 | 9/2012 | Willson | |
| 8,307,109 B2 | 11/2012 | Mamou et al. | |
| 8,504,408 B2 | 8/2013 | Banthia et al. | |
| 8,510,261 B1 | 8/2013 | Samantray | |
| 2005/0256892 A1* | 11/2005 | Harken | G06F 17/303 |
| 2006/0010195 A1* | 1/2006 | Mamou | G06Q 10/10 709/203 |
| 2011/0153568 A1* | 6/2011 | Shang | G06F 11/2094 707/648 |
| 2012/0042097 A1 | 2/2012 | Dudley | |
| 2012/0131481 A1* | 5/2012 | Gupta | G06Q 10/10 715/764 |
| 2012/0246170 A1 | 9/2012 | Iantorno | |
| 2012/0265725 A1 | 10/2012 | Werner | |
| 2013/0117216 A1* | 5/2013 | Bhide | G06F 17/30563 707/602 |
| 2013/0275362 A1 | 10/2013 | Nagel et al. | |
| 2013/0332484 A1* | 12/2013 | Gajic | G06F 17/30286 707/770 |
| 2014/0046638 A1* | 2/2014 | Peloski | G06F 17/5009 703/6 |

FOREIGN PATENT DOCUMENTS

WO   WO-0159613 A2   8/2001

* cited by examiner

*Primary Examiner* — Dung K Chau
(74) *Attorney, Agent, or Firm* — Buckley, Maschoff & Talwalkar LLC

(57) ABSTRACT

According to some embodiments, a method and an apparatus of importing data using a database management system ("DBMS") with integrated Extract, Transform and Load ("ETL") functionality. The method comprises receiving a command to access data. The command is associated with an ETL function. An executable file associated with the ETL function is called and the data associated with the command is received.

17 Claims, 4 Drawing Sheets

300

| City | High | Low | Median |
|---|---|---|---|
| Rome | 85 | 37 | 67 |
| New York | 90 | 20 | 55 |
| Tel Aviv | 96 | 39 | 81 |
| Moscow | 84 | 15 | 48 |

| Name | Details |
|---|---|
| table_1 | DB_Table |
| dsrepo1 | ACTA.DLL |
| StoPro_1 | Stored Procedure |
| table_2 | DB_Table |

NEXT GENERATION ARCHITECTURE FOR DATABASE CONNECTIVITY

BACKGROUND

Extract, transform, and load ("ETL") products relate to the extraction of data from a source, transforming the data to fit an operational need, and/or loading the transformed data into a target (e.g., a database, data warehouse, an application, a flat file, etc.). Each conventional ETL product may use predefined sources and predefined targets and a set of related predefined transforms.

The majority of targets for conventional ETL products are databases. However, since an ETL product and a database comprise two separate software platforms, the ETL product can time out while trying to transmit data to the database and connectivity may be lost due to network issues or performance issues. For example, when dealing with large amounts of data (e.g., an in-memory database that comprises a large quantity of data), ETL products may experience a degradation in performance due to processing problems and memory overflows which may disrupt communication with the database.

BRIEF DESCRIPTION OF THE DRAWINGS

FIG. 3 illustrates a received data set according to some embodiments.

FIG. 4 illustrates a data dictionary according to some embodiments.

DETAILED DESCRIPTION

The present embodiments relate to a method, apparatus and system to accessing data using a database management system ("DBMS") that comprises integrated ETL functionality.

Figure 1:
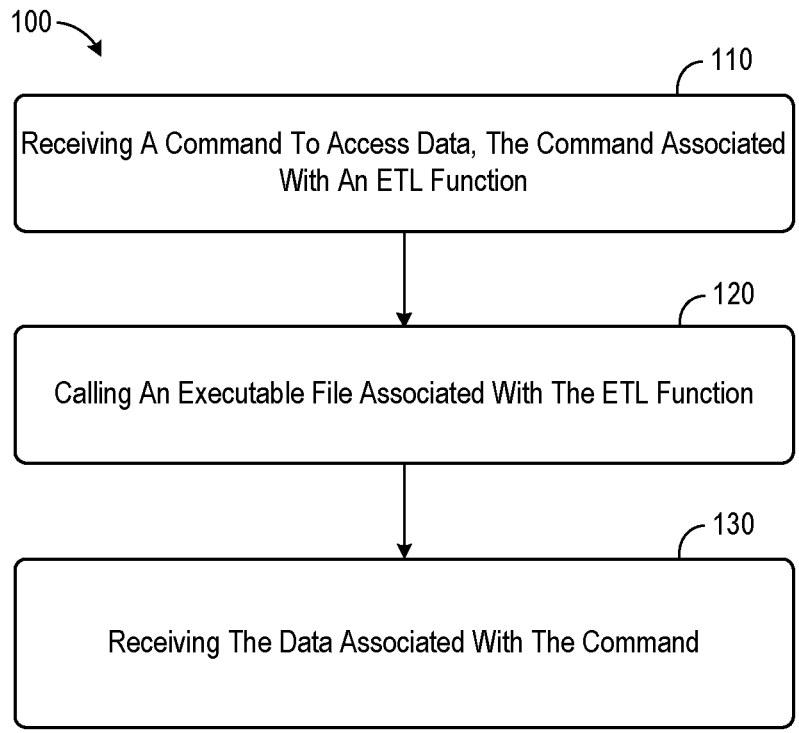
FIG. 1 illustrates a method according to some embodiments.

Turning now in detail to the drawings, FIG. 1 is a flow chart that illustrates a method 100 that may be performed according to some embodiments. The flow chart in FIG. 1 does not imply a fixed order to the steps, and embodiments of the present invention can be practiced in any order that is practicable. Moreover, the methods may be performed by any of the devices described herein. The method shown in FIG. 1 may be performed, for example, by the database system 200 of FIG. 2 and the apparatus 500 of FIG. 5. The method 100 may be embodied on a non-transitory computer-readable medium.

At 110, a command to access data is received. The command may be associated with an ETL function. Accessing data may comprise reading, writing importing, exporting or transforming. In one embodiment, the command may be associated with a stored procedure, a function or a subroutine. A stored procedure may comprise a subroutine that is available to an application to access a DBMS. In some embodiments, a stored procedure may be stored in a database data dictionary such as the data dictionary described with respect to FIG. 4. The commands contained within the stored procedure may, for example, perform a plurality of operations, such as, but not limited to, an import and an update operation as shown below:

```
IMPORT <data> FROM <source>;
UPDATE <schema>.table ;
```

In some embodiments, a stored procedure may comprise language such as IMPORT high, low, median "Job1" FROM dsrepo1 where import is a command executable; high, low, and median relate to data fields that will be imported; "Job1" is a name of a job; and FROM dsrepo1 indicates that ETL functionality will be used to import the data using repository dsrepo1. As illustrated, the stored procedure may also comprise an update command that indicates to the database that the imported information will be loaded into a particular table. The stored procedure may also use parameters and variables to further define the details of processing, for example, to specify a specific job server in a distributed computing environment and whether the repository is an external repository or internal repository.

In some embodiments, the command may be an execution of, or reading from, a file that comprises a name with a special syntax that may be used to call ETL functionality within a database, for example: '@job1.dsrepo1' where dsrepo1 again indicates that the ETL functionality of the database will be used to import data for job1. If a database job using ETL functionality has several outputs, an individual output may also be specified, for example: @job1.dsrepo1.output1 (where output1 is the name of one output of a loader schema in job1).

In another embodiment of a command, a structured query language ("SQL") SELECT statement may be used to indicate that ETL functionality will be used and the SQL statement may initiate an ETL job where the ETL job is indicated in a SQL FROM clause. For example:

```
SELECT HIGH, LOW, MEDIAN
FROM DSREPO1.WEATHER_INFORMATION
```

This query may indicate that ETL functionality will be used to retrieve fields high, low and median from job weather_information as an ETL job stored in the repository DSREPO1. In some embodiments, the query may related to SQL by comprising some elements of SQL and thus the query maybe SQL-Like.

According to some embodiments, integrating a DBMS with ETL functions may provide new capabilities to the DBMS such as real-time transactions, error recovery, test data generation, and server clustering for fault tolerance and distributed processing.

Furthermore, a DBMS may provide additional services for ETL jobs, such as temporary storage and processing functionality for operations such as sorting very large amount of data, functions and procedures for additional data manipulation, ability to store snapshots and checkpoints for data recovery and debugging, change data capture ("CDC") implementation, parallel processing and scalability.

Figure 2:
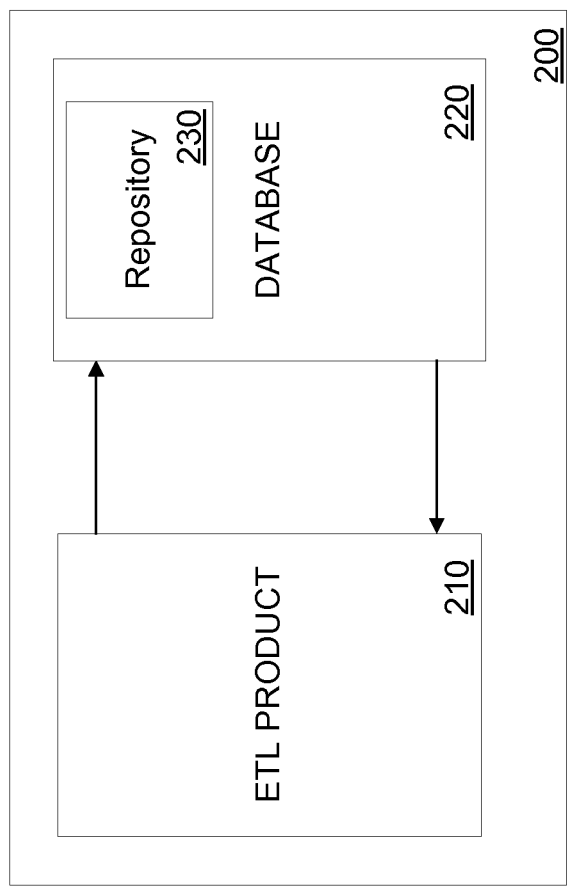
FIG. 2 illustrates a database system according to some embodiments.

For purposes of illustrating features of the present embodiments, a simple example will now be introduced and referenced throughout the disclosure. Those skilled in the art will recognize that this example is illustrative and not limiting and is provided purely for explanatory purposes. For example, a database user, via a user interface, such as, but not limited to, SAP's HANA studio may indicate a source, such as, a spreadsheet entitled weather_information and a local target such as "_LocalHANADatabase" (e.g., a database). The database user may desire to import three rows of data from weather_information job into _LocalHANA-Database. To import the data, the database may initiate a command. Now referring to FIG. 2, the database user may desire to import the three rows of data from a job in repository 230 such as, but not limited to, a spreadsheet, database, flat file, or any data source. As illustrated in FIG. 2, the repository 230 may be internal to a database. However, in some embodiments, the repository 230 may be external to a database such as a flat file. The job in repository 230 may be associated with weather and the database user may wish to import the three rows that comprise a high temperature, a low temperature and a median temperature, respectively. The database user may enter information via a user interface associated with a DBMS 200. The DBMS 200 may comprise both a database 220 and an integrated ETL product 210 to provide integrated ETL functionality in the DBMS 200. The database user, via the DBMS 200 may retrieve the desired three rows of data by executing the following query at the DBMS 200:

---
SELECT HIGH, LOW, MEDIAN
FROM DSREPO1.WEATHER_INFORMATION
---

Referring back to FIG. 1, at 120 an executable file, such as, but not limited to a Dynamic Link Library ("DLL"), or a shared library file associated with the ETL functionality may be called. Once a command to access data is received, a DBMS may determine that the command is associated with using ETL functionality to retrieve data. Once the DBMS determines that the command is associated with the integrated ETL functionality, the DBMS may call a DLL file. A DLL file may comprise a file that is not directly executed and may require the DBMS to load it through an entry point which may be provided by the DBMS. The DLL file may be executed in a memory space of the DBMS and with the same access permissions as a DBMS executable which may result in reduced overhead.

At run-time, the DBMS may load the DLL file to perform operations associated with ETL functionality. In some embodiments when a DBMS comprises integrated ETL functionality and is also in communication with an external ETL product, the DBMS may indicate that the DLL file (via parameters used to call the DLL) will call the integrated ETL functionality and not an external ETL product, for example, by calling an initialization method for the DBMS and ETL integration. In view of how ETL functionality is called, reading data via ETL functionality may be similar to reading from a file and thus the DBMS may not need to use communication commands such as "fopen", "fread", and "fget" and as a result this may decrease system overhead.

In some cases, additional ETL data operations such as lookups may be performed via the DBMS instead of the ETL functionality. Since the ETL functionality may need to use external resources (data), by using internal DBMS resources ETL performance may be improved by eliminating a need for network communications to external ETL resources. For example, if the weather temperatures from weather_information job are in Celsius and a database user desires the temperatures to be in Fahrenheit, a transformation of the temperatures may be made by the DBMS (assuming that the transformation information is located within the DBMS). However, should the database not comprise the necessary transformation information associated with Celsius and Fahrenheit, the ETL functionality may perform the transformation and may call external resources. The output of an ETL job may be strictly structured and typified, even for data sources that contain unstructured data, which means that the DBMS can receive metadata either as streamed data from an internal repository that resides inside a DBMS, or from an external repository associated with the ETL functionality and use the metadata to load a target table within the DBMS.

The present embodiments may also provide a method to start an ETL job from within the DBMS since the DBMS may comprise or have access to repositories that are associated with the ETL product and thus the DBMS may comprise an application that can generate new ETL jobs or modify existing ETL jobs. Besides loading a DLL file, the present embodiments may also be implemented by using hosted services, or web services. ETL jobs may be executed on a specific job server or using a job server cluster, from any database server.

The present embodiments may apply to both traditional disk-based databases as well as in-memory databases and the ETL tool may output data in either a row-based or column-based format. The present embodiments may also provide integration and a common user interface for suites and applications that share a same database platform. The integrated ETL functionality may be independently enhanced with new capabilities, such as complex event processing (CEP), Data Quality (DQ), Master Data Management (MDM), etc. and all these benefits may be immediately available to all database applications.

Referring now to the illustrated embodiment, the DBMS, in response to the query may determine that schema DSREPO1 is associated with ETL functionality by looking up DSREPO1 in a data dictionary. For example, and now referring to FIG. 4, an embodiment of a data dictionary 400 is illustrated. The data dictionary may define fields 410 and 420. Field 410 may indicate a name of a database element such as a table, row, column, stored procedure, view, etc. Field 420 may indicate details associated with a corresponding name 410. For example, dsrepo1 as indicted in 410 relates to an ACTA.DLL (as illustrated in 420). Based on the lookup in the data dictionary 400, the DBMS 200 may then call a DLL (e.g., ACTA.DLL) which is executed by the DBMS 200 and the query is then executed by the integrated ETL functionality in the DLL. In some embodiments, determining that a command to access data is associated with an ETL function may be performed by examining command options that indicate that a command is associated with calling an ETL function.

At 130, the data associated with the command is received. The ETL job may return a plurality of data to the DBMS. Now referring to FIG. 3, an embodiment of a returned result dataset 300 is illustrated. Continuing with the illustrative example, the integrated ETL functionality may query dataset 300. Dataset 300 defines fields 310, 320, 330, 340. Field 310 may indicate a name of a city. Field 320 may indicate a high temperature associated with a respective city 310. Field 330 may indicate a low temperature associated with a respective city 310. Field 340 may indicate a median temperature associated with a respective city 310. Thus, the query may return the following results:

85, 37, 67
    90, 20, 55
    96, 39, 81
    84, 15, 48

Results of the query executed by the ETL functionality may be streamed to the DBMS 200 and the DBMS 200 may start further processing before a job being executed by the ETL functionality finishes. There may be no need for staging data anywhere in the present process, either by ETL engine or database engine. By having ETL functionality integrated, the present embodiments may allow for complete statistics, debugging and monitoring of every step in the ETL to DBMS process. For example, the present embodiments may provide an ability to know whether an ETL job finished successfully before further processing in the DBMS begins. Access to common metadata may extend data lineage from source systems all the way to database targets.

An integrated GUI environment for the database and ETL tool may be provided to users with broad business skills but without programmer expertise to allow common visual development without writing any code. This visual environment may also be integrated with user interfaces for other suites and applications that share a same database platform. The database in the illustrated embodiment can be a stand-alone database system or may be a part of a bigger application system such as SAP ERP, SAP CRM or SAP BW. A common access control for these applications, such as single sign-on, may be implemented. Such GUI environment may provide direct access to all data sources supported by an ETL tool, allowing data access to be configured using an ETL portion of the interface and used by any integrated application such as SAP Financials. This integrated interface may have dedicated buttons and other visual elements to perform at least some of ETL functions, such as ViewData. Generated ETL jobs may be visible to a user or may be hidden using user interface configuration settings.

Internally, an ETL job can be represented as an existing object type, such as stored procedure, function, subroutine, database table, virtual table, view, etc. or it can be a new data description language ("DDL") object. By using a DDL object, an ETL function may be represented a completely new object. ETL jobs may be real-time, or batch jobs, and batch jobs may use a database or another scheduler. A database engine may write a data set from ETL directly to a table or may read the data set and perform further processing. New, specialized database operations may be introduced and data loading into the database may be able to take advantage of these internal transactions not available for external programs. The entire process flow, from ETL sources to database targets, may be represented as a data flow graph and then optimized for maximum performance.

Figure 5:
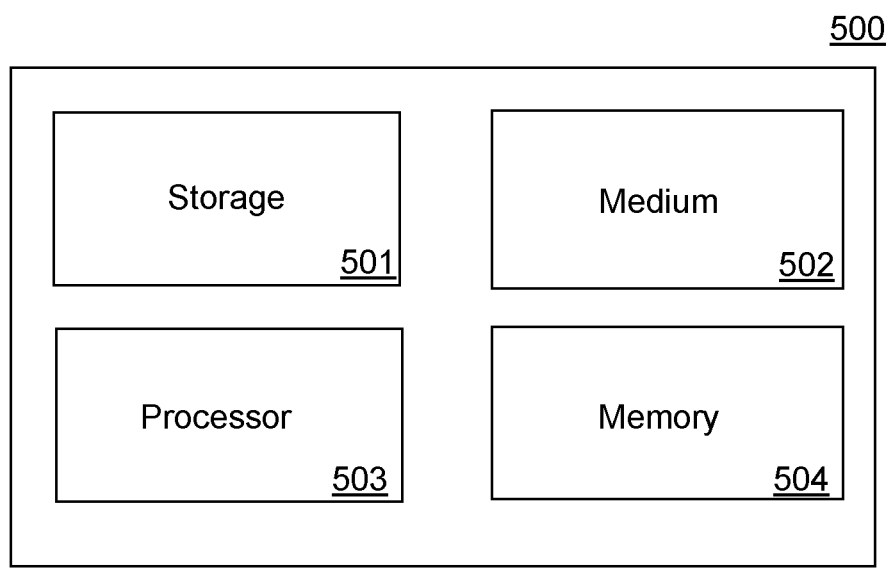
FIG. 5 illustrates an apparatus according to some embodiments.

Now referring to FIG. 5, an embodiment of an apparatus 500 is illustrated. In some embodiments, the apparatus 500 may be associated with a DBMS that has incorporated ETL functionality.

The apparatus 500 may comprise a storage device 501, a medium 502, a processor 503, and a memory 504. According to some embodiments, the apparatus 500 may further comprise a digital display port, such as a port adapted to be coupled to a digital computer monitor, television, portable display screen, or the like.

The medium 502 may comprise any computer-readable medium that may store processor-executable instructions to be executed by the processor 503. For example, the medium 502 may comprise a non-transitory tangible medium such as, but not limited to, a compact disk, a digital video disk, flash memory, optical storage, random access memory, read only memory, or magnetic media.

A program may be stored on the medium 502 in a compressed, uncompiled and/or encrypted format. The program may furthermore include other program elements, such as an operating system, a database management system, and/or device drivers used by the processor 503 to interface with peripheral devices.

The processor 503 may include or otherwise be associated with dedicated registers, stacks, queues, etc. that are used to execute program code and/or one or more of these elements may be shared there between. In some embodiments, the processor 503 may comprise an integrated circuit. In some embodiments, the processor 503 may comprise circuitry to perform a method such as, but not limited to, the method described with respect to FIG. 1.

The processor 503 communicates with the storage device 501. The storage device 501 may comprise any appropriate information storage device, including combinations of magnetic storage devices (e.g., a hard disk drive), optical storage devices, flash drives, and/or semiconductor memory devices. The storage device 501 stores a program for controlling the processor 503. The processor 503 performs instructions of the program, and thereby operates in accordance with any of the embodiments described herein.

The main memory 504 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 504 may comprise a plurality of memory modules.

As used herein, information may be "received" by or "transmitted" to, for example: (i) the apparatus 500 from another device; or (ii) a software application or module within the apparatus 500 from another software application, module, or any other source.

In some embodiments, the storage device 501 stores a database (e.g., including information associated with ETL functionality). Note that the database described herein is only an example, and additional and/or different information may be stored therein. Moreover, various databases might be split or combined in accordance with any of the embodiments described herein. In some embodiments, an external database may be used.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method of importing data using a database management system ("DBMS") with integrated Extract, Transform and Load ("ETL") functionality, the method comprising:
   receiving a command at a DBMS comprising an integrated ETL function to access data, wherein the command to access data comprises an SQL or SQL-like query and the query comprises a from statement that indicates a job name associated with the ETL function;
   performing a lookup of the command in a data dictionary associated with the DBMS to determine that the command is to access data via the integrated ETL function;
   loading an executable file associated with the command into the DBMS, wherein the command is determined to access data via the integrated ETL function;
   executing, via a processor, the executable file associated with the ETL function in a memory space of the DBMS; and
   receiving the data associated with the command.

2. The method of claim 1, wherein the command to access data comprises a structured query language ("SQL") or SQL-like query.

3. The method of claim 1, wherein the command to access data comprises a stored procedure, a function or a subroutine.

4. The method of claim 1, further comprising:
  determining that the command to access data is associated with the ETL function based on command options.

5. The method of claim 1, wherein the command to access data comprises a stored procedure and the stored procedure indicates a job name to call the ETL function.

6. A non-transitory computer-readable medium comprising instructions that when executed by a processor perform a method of importing data using a database management system ("DBMS") with integrated Extract, Transform and Load ("ETL") functionality, the method comprising:
  receiving a command at a DBMS comprising an integrated ETL function to access data, wherein the command to access data comprises an SQL or SQL-like query and the query comprises a from statement that indicates a job name associated with the ETL function;
  performing a lookup of the command in a data dictionary associated with the DBMS to determine that the command is to access data via the integrated ETL function;
  loading an executable file associated with the command into the DBMS, wherein the command is determined to access data via the integrated ETL function;
  executing, via a processor, the executable file associated with the ETL function in a memory space of the DBMS; and
  receiving the data associated with the command.

7. The medium of claim 6, wherein the command to access data comprises an SQL or SQL-like query.

8. The medium of claim 6, wherein the command to access data comprises a stored procedure, a function or a subroutine.

9. The medium of claim 6, further comprising:
  determining that the command to access data is associated with the ETL function based on command options.

10. The medium of claim 6, wherein the command to access data comprises a stored procedure and the stored procedure indicates a job name to call the ETL function.

11. An apparatus comprising:
  a processor; and
  a non-transitory computer-readable medium comprising instructions that when executed by the processor perform a method of importing data using a database management system ("DBMS") with integrated Extract, Transform and Load ("ETL") functionality, the method comprising:
  receiving a command at a DBMS comprising an integrated ETL function to access data, wherein the command to access data comprises an SQL or SQL-like query and the query comprises a from statement that indicates a job name associated with the ETL function;
  performing a lookup of the command in a data dictionary associated with the DBMS to determine that the command is to access data via the integrated ETL function;
  loading an executable file associated with the command into the DBMS, wherein the command is determined to access data via the integrated ETL function;
  executing, via a processor, the executable file associated with the ETL function in a memory space of the DBMS; and
  receiving the data associated with the command.

12. The apparatus of claim 11, wherein the command to access data comprises an SQL or SQL-like query.

13. The apparatus of claim 11, wherein the command to access data comprises a stored procedure, a function or a subroutine.

14. The apparatus of claim 11, wherein the method further comprises:
  determining that the command to access data is associated with the ETL function based on command options.

15. The apparatus of claim 11, wherein the command to access data comprises a stored procedure and the stored procedure indicates a job name to call the ETL function.

16. The apparatus of claim 11, wherein the executable file comprises a Dynamic Link Library ("DLL").

17. The apparatus of claim 11, wherein the ETL function is represented as a data description language ("DDL") object.

* * * * *